United States Patent [19]

Miner

[11] 4,142,586
[45] Mar. 6, 1979

[54] TINES CONSTRUCTION
[75] Inventor: Earl L. Miner, Long Lane, Mo.
[73] Assignee: Detroit Tool & Engineering Co., Lebanon, Mo.
[21] Appl. No.: 806,183
[22] Filed: Jun. 13, 1977

Related U.S. Application Data

[63] Continuation-in-part of Ser. No. 700,760, Jun. 29, 1976.

[51] Int. Cl.² ............................................. A01B 33/14
[52] U.S. Cl. ...................................... 172/42; 172/58; 172/116; 172/772
[58] Field of Search ....................... 172/42, 43, 49, 57, 172/58, 108, 527, 532, 108, 35, 116, 103, 109, 111, 119, 122, 123, 124, 388, 772

[56] References Cited
U.S. PATENT DOCUMENTS 2,643,599  6/1953  Wharton ............................. 172/42 X
2,755,718  7/1956  Arndt ................................... 172/42
2,847,924  8/1958  Quick ................................ 172/42 X
3,282,353  11/1966  Troyer et al. ......................... 172/43

FOREIGN PATENT DOCUMENTS 27779   6/1931  Australia ................................... 172/42
849930  9/1952  Fed. Rep. of Germany ............. 172/42
1049144 1/1959  Fed. Rep. of Germany ........... 172/111

Primary Examiner—Paul E. Shapiro
Attorney, Agent, or Firm—Cohn, Powell & Hind

[57] ABSTRACT

This tines assembly is for attachment to a drive shaft and includes a front shaft portion, a rear shaft portion connected between the front shaft portion and the drive shaft, and front and rear tines mounted in removable relation to the rear shaft portion. The front tines, front shaft and rear shaft are connected and located by a pin, and the rear tines, rear shaft and drive shaft are connected and located by a pin.

12 Claims, 4 Drawing Figures

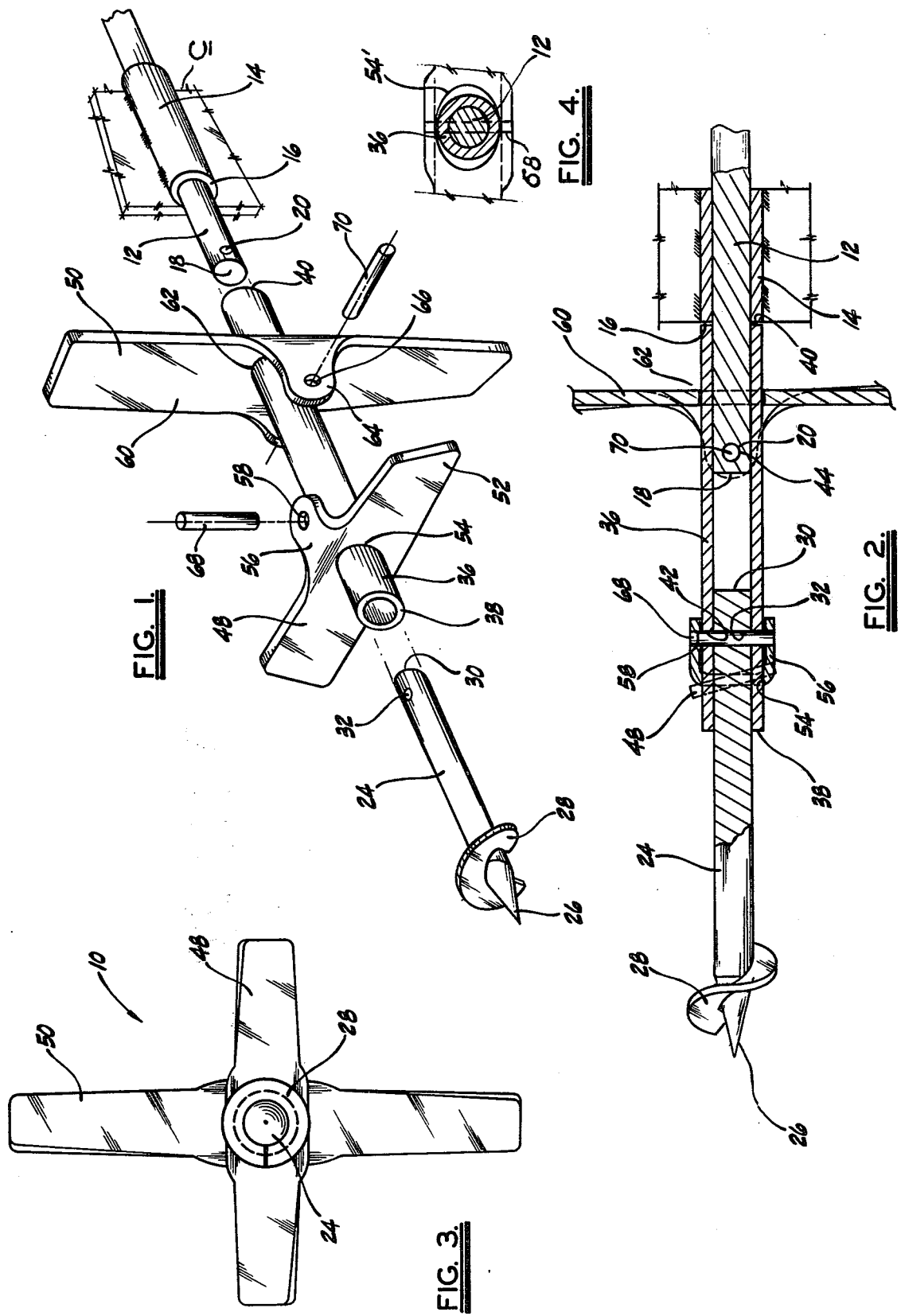

TINES CONSTRUCTION

RELATED U.S. APPLICATION DATA

Continuation-in-part of Ser. No. 700,760 filed June 29, 1976 and related to Ser. No. 644,319 filed Mar. 5, 1976.

BACKGROUND OF THE INVENTION

This invention relates to a tines assembly and particularly to an assembly having pin-connected and located component parts.

A cultivator having a tines assembly which includes a front screw and spaced cutting tines integrally welded to a common shaft is disclosed in commonly owned co-pending application Ser. No. 700,760 filed June 29, 1976. This tines assembly provides a particularly efficient cutting system for cultivators and the like. However, it has been found that welding is both expensive and time-consuming because of the considerable amount of weld metal required to provide a satisfactory connection and because of the need to connect and locate the various components accurately together prior to the welding operation.

The present tines assembly overcomes these and other problems in a manner not disclosed in the known prior art.

SUMMARY OF THE INVENTION

This tines assembly includes a front shaft portion carrying a screw, and a rear shaft portion connected to a drive shaft portion and carrying cutting tines. The tines and shaft portions are pin connected together.

The front shaft portion includes a transverse aperture and the rear shaft portion includes forwardly and rearwardly disposed transverse apertures, said forwardly disposed transverse apertures being coaxially alignable with the transverse aperture of the front shaft, and the rearwardly disposed apertures being coaxially alignable with a transverse aperture in the drive shaft.

The front tines include an opening receiving at least one of said front and rear shaft portions and transverse apertures. The transverse apertures are coaxially alignable with the transverse aperture of the front shaft portion and the forwardly disposed transverse apertures of the rear shaft portion, and a front pin, receivable by said aligned transverse apertures, connects said front and rear shaft portions and said front tines together. The rear tines include an opening receiving at least one of said rear shaft and drive shaft portions and transverse apertures. The transverse apertures are coaxially alignable with the transverse aperture of the drive shaft portion and the rearwardly disposed transverse aperture of the rear shaft portion and a rear pin, receivable by said aligned transverse apertures, connects said rear and drive shaft portions and said rear tines together.

The rear shaft portion has a sleeve configuration and receives the front shaft portion and drive shaft portion in sliding relation. The opening of each of the front and rear tines receives the sleeve in sliding relation and the transverse apertures of the front and rear tines are longitudinally spaced from their associated openings to provide a couple resistance for increased mounting stability.

Each of the tines includes a substantially flat radial blade providing the tines opening and opposed side lugs providing the transverse apertures receiving the pins.

In one embodiment the tines openings are elongated to permit movement relative to a perpendicular plane of rotation to facilitate deflection of the blades from rocks and the like.

The radial blade and side lugs can be unitarily formed and this tines assembly is simple and inexpensive to manufacture and can be readily installed without the use of welding.

BRIEF DESCRIPTION OF THE DRAWING

FIG. 1 is an exploded, perspective view of the tines assembly;

FIG. 2 is an enlarged fragmentary longitudinal sectional view of the assembly;

FIG. 3 is a front and elevational view; and

FIG. 4 is a fragmentary cross sectional view of a modified tines structure.

DESCRIPTION OF THE PREFERRED EMBODIMENT

Referring now by reference numerals to the drawing and first to FIG. 1 it will be understood that the tines assembly is generally indicated by numeral 10. The assembly is intended for use with cultivator devices and the like and is attachable to the rotating drive shaft of a cultivator such as that disclosed in applicant's co-pending application Ser. No. 700,760 filed June 29, 1976. This drive shaft is indicated by numeral 12 in FIGS. 1 and 2 and is rotatably mounted to the cultivator indicated by C as by journal bearing 14 welded thereto. As clearly shown in FIG. 1 the drive shaft 12 includes an end portion 18 projecting outwardly from the journal end 16 and having a transverse aperture 20.

The tines assembly 10 includes a shaft portion 24, constituting a first or front shaft means, and having a pointed end 26 with a helical screw portion 28 welded thereon. A transverse aperture 32 is provided adjacent the shaft rear end 30. tuting a first or front shaft means, and having a pointed end 26 with a helical screw portion 28 welded thereon. A transverse aperture 32 is provided adjacent the shaft rear end 30. The tines assembly 10 also includes a sleeve member 36, constituting a second or rear shaft means and having front and rear ends 38 and 40 respectively. A pair of opposed transverse apertures 42 are provided adjacent said front end of said sleeve and a pair of similar apertures 44 are provided adjacent said rear end of said sleeve (FIG. 2). The transversely aligned axis of said apertures 42 and the transversely aligned axis of apertures 44 are disposed in substantially perpendicular, angular relation to each other.

Front and rear tines or cutting members 48 and 50 constituting first and second tine means respectively are carried by the sleeve 36 and said members are substantially similar to each other except that the rear tines 50 are substantially longer than said front tines 48. The front tines 48 include blade portions 52 having a central opening 54, and a pair of lugs 56 having opposed transverse apertures 58. The rear tines 50 include blade portions 60 having a central opening 62, and a pair of lugs 64 having opposed transverse apertures 66.

As clearly shown in FIGS. 1 and 2 the components of the tines assembly 10 are connected together by front and rear transverse pins 68 and 70 constituting first and second securing means respectively as follows:

The central opening 54 of the front tines 48 is received by the sleeve 36 and the lug apertures 58 of said tines are aligned with the forwardly disposed sleeve apertures 42. The front shaft portion rear end 30 is inserted within the sleeve 36 and the transverse aperture 32 thereof is aligned with said sleeve apertures 42. When this alignment is accomplished, pin 68 is inserted to connect the front shaft portion 24, the sleeve 36 and the front tines 48 together by a single pin element. It will be understood that the pin 68 not only connects these components together but automatically locates the tines 48 in the correct position. The rear tines central opening 62 is similarly received by the sleeve member 36 and the drive shaft front portion 18 is inserted within said sleeve until the sleeve end 40 is in adjacent abutting relation with the journal end 16 thereby facilitating rapid preliminary longitudinal locating of said sleeve relative to said drive shaft, it being understood that the cultivator C includes a stop means (not shown) precluding rearward movement of said drive shaft 12. The rearwardly disposed sleeve apertures 44 are readily aligned with the shaft transverse aperture 20 and the rear tines lug apertures 66 are likewise aligned with the rearwardly disposed sleeve apertures 44. When this alignment is accomplished the pin 70 is inserted to connect the drive shaft, the sleeve 36 and the rear tines 50 together by the single pin element. It will be understood that the pin 70 not only connects the components of the assembly together but also automatically connects the tines 50 in the correct position both longitudinally and angularly.

The pins provide a particularly effective connection for the tines which resists both axial and torsion forces. For example, because the axis of the pin, e.g. pin 68, is disposed in spaced longitudinal relation from the plane of the blade opening 54, a couple resistance is offered to bending forces exerted on the blades in the general direction of the longitudinal axis of the sleeve 36. In addition, the pin connection provides double shear resistance against rotational forces on said tines. And further, the tines blade and lug construction lends itself readily to being formed unitarily as from a spring steel stamping.

A modified tines structure is indicated in FIG. 4. The modification consists in providing the front and rear tines with an elongated central opening, indicated by numeral 54' with reference to the front tines. The elongated opening permits the tines to pivot about the pin 68 and permits a rocking action of the tine blades 52 so that the tips of said blades can move out of the perpendicular plane of rotation. This feature in some instances improves the cutting action and facilitates the relative deflection between the blades and rocks and the like.

It will be readily understood that the tines assembly can be dismantled for removal and replacement of parts, particularly the tines, in the case of wear or repair.

I claim as my invention:

1. A tines assembly comprising:
   a. a drive shaft having transverse means for accepting a securing element therein,
   b. a front shaft having transverse means for accepting a securing element therein,
   c. a rear shaft disposed in connecting coaxial relation with said front shaft and said drive shaft and having forwardly and rearwardly disposed transverse means for accepting a securing element therein, the forwardly disposed transverse means being aligned with the transverse means of the front shaft and the rearwardly disposed means being aligned with the transverse means of the drive shaft,
   d. a front tine including an opening adapted to receive at least one of said front and rear shafts, and transverse means for accepting a securing element therein aligned with the transverse means of said front shaft and the forwardly disposed transverse means of said rear shaft,
   e. front securing means including a securing element received by said aligned transverse means for connecting said front shaft, rear shaft and front tine together,
   f. a rear tine including an opening adapted to receive at least one of said rear and drive shafts, and transverse means for accepting a securing element therein aligned with the transverse means of said drive shaft and the rearwardly disposed transverse means of said rear shaft, and
   g. rear securing means including a securing element received by said aligned tranverse means for connecting said rear shaft, drive shaft, and said second tine together.

2. A tines assembly as defined in claim 1, in which:
   h. said rear shaft includes sleeve means for receiving said front shaft and said drive shaft in sliding relation.

3. A tines assembly as defined in claim 2, in which:
   i. the opening of each of said front and rear tines receives said sleeve means in sliding rotation and the transverse means of said front and rear tines are longitudinally spaced from their associated openings.

4. A tines assembly as defined in claim 3, in which:
   j. each of said tines includes a substantially flat radial blade portion providing said opening and opposed side lug portions providing said transverse means.

5. A tines assembly comprising:
   a. a first shaft having a transverse means for accepting a securing element therein,
   b. a second shaft disposed in coaxial relation with said first shaft and having transverse means for accepting a securing element therein aligned with the transverse means of said first shaft,
   c. a tine including an opening adapted to receive at least one of said first and second shafts and transverse means for accepting a securing element therein disposed outwardly of and aligned with the transverse means of both of said shafts, and
   d. securing means including a securing element received by said aligned, transverse means for connecting both of said shafts and said tine together.

6. A tines assembly as defined in claim 5, in which:
   e. said second shaft is a sleeve receiving said first shaft in sliding relation.

7. A tines assembly as defined in claim 6, in which:
   f. said tine opening receives said sleeve in sliding relation and said transverse means are longitudinally spaced from said opening.

8. A tines assembly as defined in claim 7, in which:
   g. said tine includes a substantially flat radial blade portion providing said opening and opposed side lug portions providing said transverse means.

9. A tines assembly as defined in claim 8, in which:
   h. said radial blade and said side lugs are unitarily formed.

10. A tines assembly as defined in claim 8, in which:
    h. said opening is elongate in a direction substantially perpendicular to the axis of rotation of said blade.

11. A tines assembly as defined in claim 5, in which:

e. said first shaft includes a screw portion at the forward end.

12. A tines assembly comprising:
   a. a drive shaft having a transverse aperture,
   b. a front shaft having a transverse aperture,
   c. a sleeve disposed in connecting coaxial relation with said front shaft and said drive shaft and having forwardly and rearwardly disposed transverse apertures, the forwardly disposed transverse apertures being aligned with the transverse aperture of the front shaft and the rearwardly disposed apertures being aligned with the transverse aperture of the drive shaft,
   d. a front tine including an opening adapted to receive at least one of said front shaft and sleeve, and lug portions including transverse apertures aligned with and disposed outwardly of the transverse aperture of said front shaft and the forwardly disposed transverse apertures of said sleeve,
   e. front securing means received by said aligned transverse apertures for connecting said front shaft, rear shaft, and front tine together in removable relation,
   f. a rear tine including an opening adapted to receive at least one of said sleeve and drive shaft, and lug portions including transverse apertures aligned with and disposed outwardly of the transverse aperture of said drive shaft and the rearwardly disposed transverse apertures of said sleeve, and
   g. rear securing means received by said aligned transverse apertures for connecting said sleeve, drive shaft, and said second tine together in removable relation.

* * * * *

UNITED STATES PATENT OFFICE
CERTIFICATE OF CORRECTION

Patent No. 4,142,586    Dated   March 6, 1979

Inventor(s)   Earl L. Miner

It is certified that error appears in the above-identified patent and that said Letters Patent are hereby corrected as shown below:

Column 2:

Line 38 after "." delete --tuting a first or front shaft means--

Lines 39-40 delete in their entirety

Line 41 before "The" delete --provided adjacent the shaft rear end 30.--

Signed and Sealed this

Twenty-ninth Day of May 1979

[SEAL]

Attest:

RUTH C. MASON
Attesting Officer

DONALD W. BANNER
Commissioner of Patents and Trademarks